United States Patent
Ishii et al.

(10) Patent No.: US 6,268,966 B1
(45) Date of Patent: Jul. 31, 2001

(54) ZOOM LENS SYSTEM

(75) Inventors: Shinichiro Ishii; Takayuki Ito, both of Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/465,782

(22) Filed: Dec. 17, 1999

(30) Foreign Application Priority Data

Dec. 22, 1998 (JP) ................................. 10-365720

(51) Int. Cl.$^7$ ................................. G02B 15/14
(52) U.S. Cl. ................. 359/692; 359/689; 359/795
(58) Field of Search ................. 359/676, 692, 359/691, 795, 689

(56) References Cited

U.S. PATENT DOCUMENTS

| | | | |
|---|---|---|---|
| 4,787,718 | * 11/1988 | Cho | 359/686 |
| 4,906,077 | 3/1990 | Ito | 359/692 |
| 4,984,877 | 1/1991 | Ito | 359/692 |
| 5,162,947 | * 11/1992 | Ito | 359/692 |
| 5,278,699 | * 1/1994 | Ito et al. | 359/692 |
| 5,280,390 | 1/1994 | Ito | 359/676 |
| 5,309,285 | 5/1994 | Ito | 359/692 |
| 5,353,162 | 10/1994 | Ito et al. | 359/692 |

(List continued on next page.)

FOREIGN PATENT DOCUMENTS

| | | | |
|---|---|---|---|
| 5-11186 | * 1/1993 | (JP) | 359/692 |
| 5-113537 | * 5/1993 | (JP) | 359/692 |
| 5-134180 | * 5/1993 | (JP) | 359/692 |
| 5-249375 | * 9/1993 | (JP) | 359/692 |
| 5-281472 | * 10/1993 | (JP) | 359/692 |
| 6-82696 | * 3/1994 | (JP) | 359/692 |
| 6-109973 | * 4/1994 | (JP) | 359/692 |

Primary Examiner—Evelyn A Lester
(74) Attorney, Agent, or Firm—Greenblum & Bernstein, P.L.C.

(57) ABSTRACT

The zoom lens system includes a positive first lens group and a negative second lens group that are arranged from an object side. The lens groups move along an optical axis to change the distance therebetween for zooming. The first lens group includes a negative first lens unit and a positive second lens unit that are arranged from the object side and each of the first and second units of the first lens group includes at least one negative lens. The zoom lens system of the present invention satisfies the following conditions (1), (2), (3) and (4);

$$-3.1 < f_t/f_{1a} < -2.5 \quad (1)$$

$$5.8 < f_t/f_{1b} < 7.0 \quad (2)$$

$$1.85 < n_{1an} \quad (3)$$

$$1.85 < n_{1bn} \quad (4)$$

where $f_t$ is the longest focal length of the entire system, $f_{1a}$ is focal length of the first lens unit;

$f_{1b}$ is focal length of the second lens unit;

$n_{1an}$ is refractive index of the negative lens in the first lens unit; and $n_{1bn}$ is refractive index of the negative lens in the second lens unit.

5 Claims, 8 Drawing Sheets

U.S. PATENT DOCUMENTS

| | | | |
|---|---|---|---|
| 5,381,270 | * | 1/1995 | Cho .................................... 359/692 |
| 5,386,321 | * | 1/1995 | Kawamura ........................ 359/692 |
| 5,434,712 | | 7/1995 | Ito ..................................... 359/692 |
| 5,526,187 | * | 6/1996 | Lee .................................... 359/692 |
| 5,530,589 | * | 6/1996 | Sato ................................... 359/692 |
| 5,570,235 | * | 10/1996 | Yoneyama ........................ 359/692 |
| 5,663,838 | | 9/1997 | Hasushita et al. ................ 359/692 |
| 5,687,028 | | 11/1997 | Ito ..................................... 359/692 |
| 5,751,498 | | 5/1998 | Ito ..................................... 359/692 |
| 5,777,800 | * | 7/1998 | Yamaguchi et al. .............. 359/692 |
| 5,808,812 | * | 9/1998 | Kamo ................................ 359/692 |
| 5,930,052 | | 7/1999 | Enomoto et al. ................. 359/692 |
| 6,072,638 | * | 6/2000 | Enomoto ........................... 359/692 |
| 6,172,819 | * | 1/2001 | Enomoto et al. ................. 359/692 |

* cited by examiner

FIG. 1
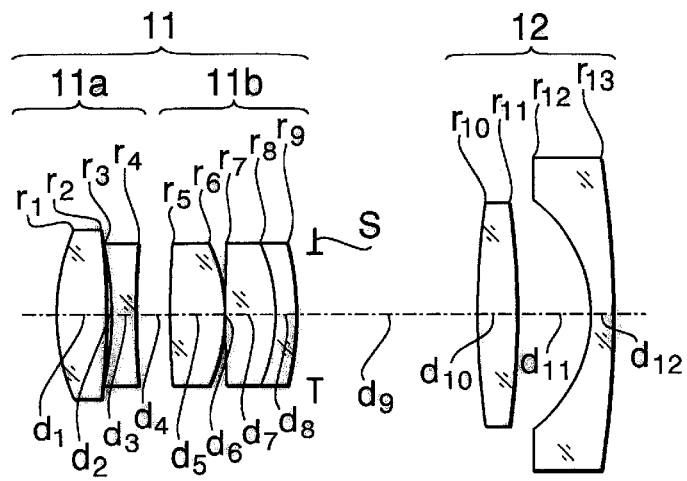
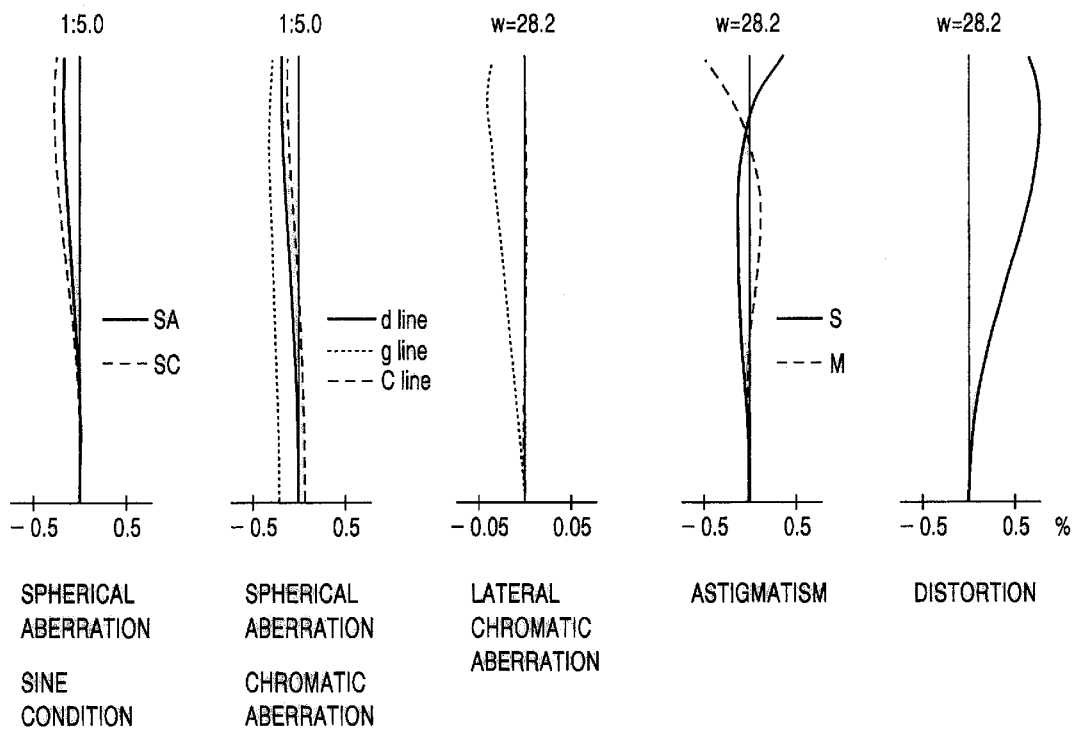
FIG. 2A — SPHERICAL ABERRATION SINE CONDITION
FIG. 2B — SPHERICAL ABERRATION CHROMATIC ABERRATION
FIG. 2C — LATERAL CHROMATIC ABERRATION
FIG. 2D — ASTIGMATISM
FIG. 2E — DISTORTION

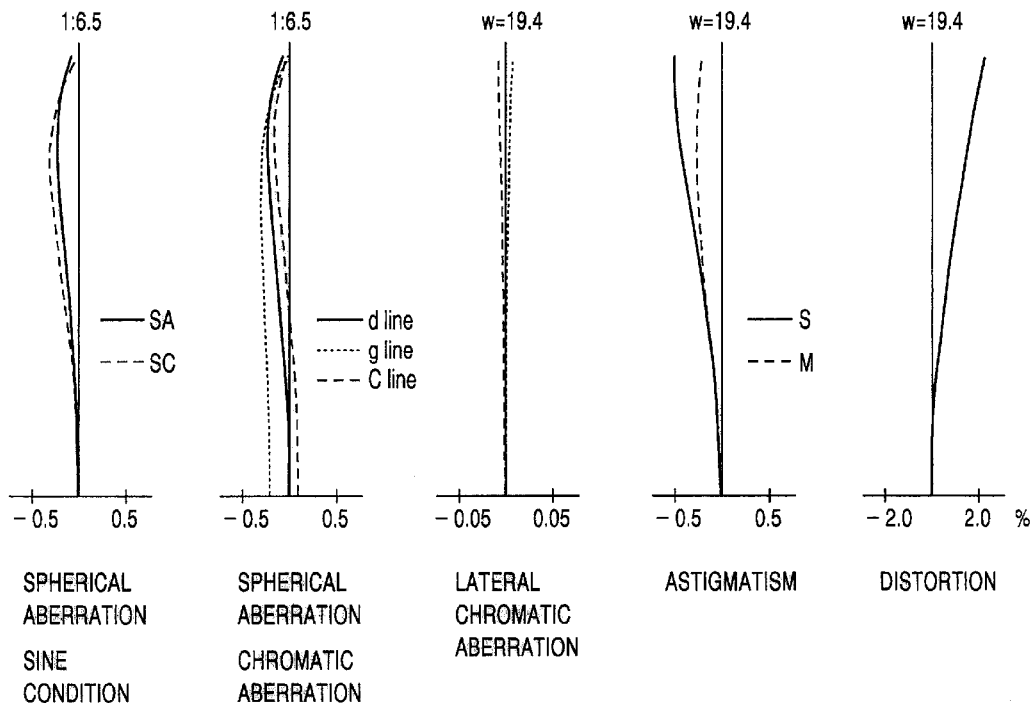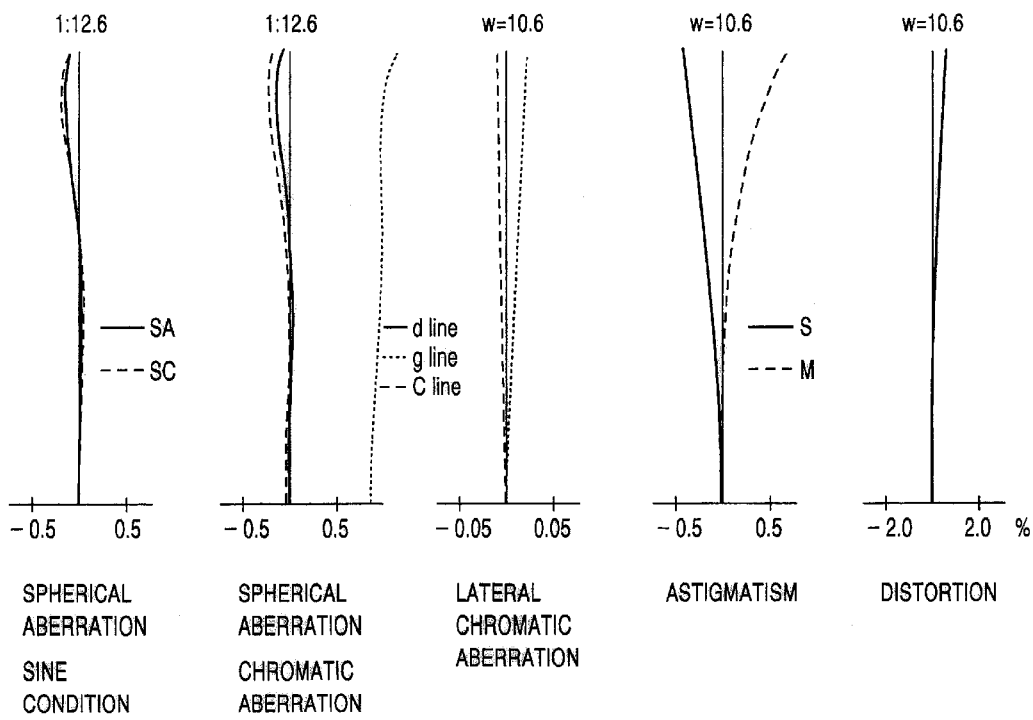

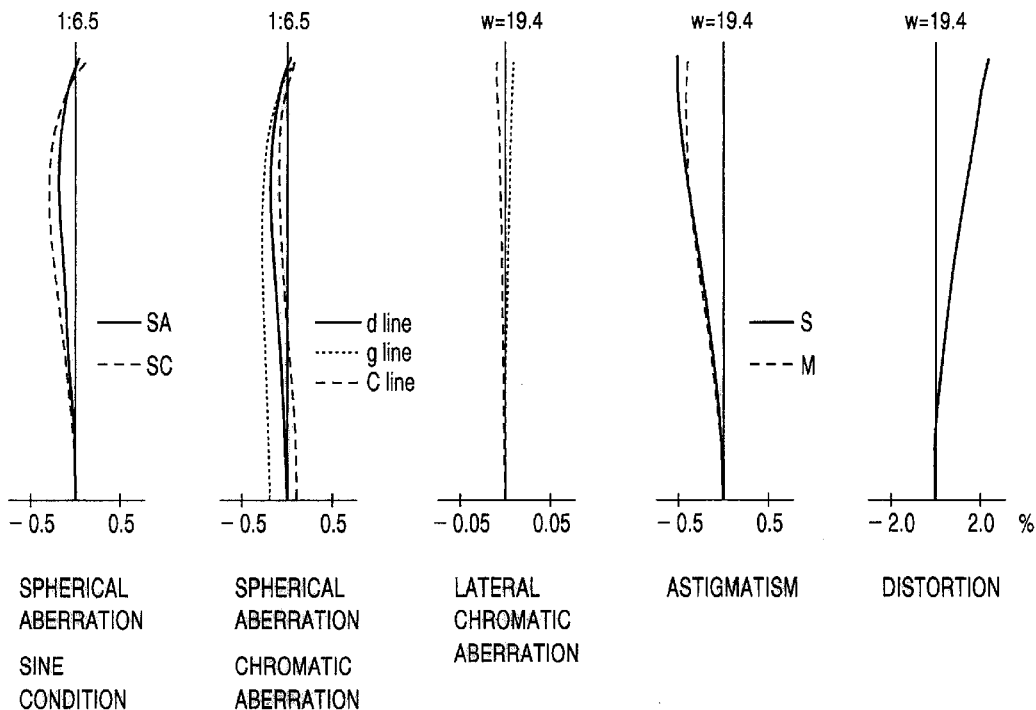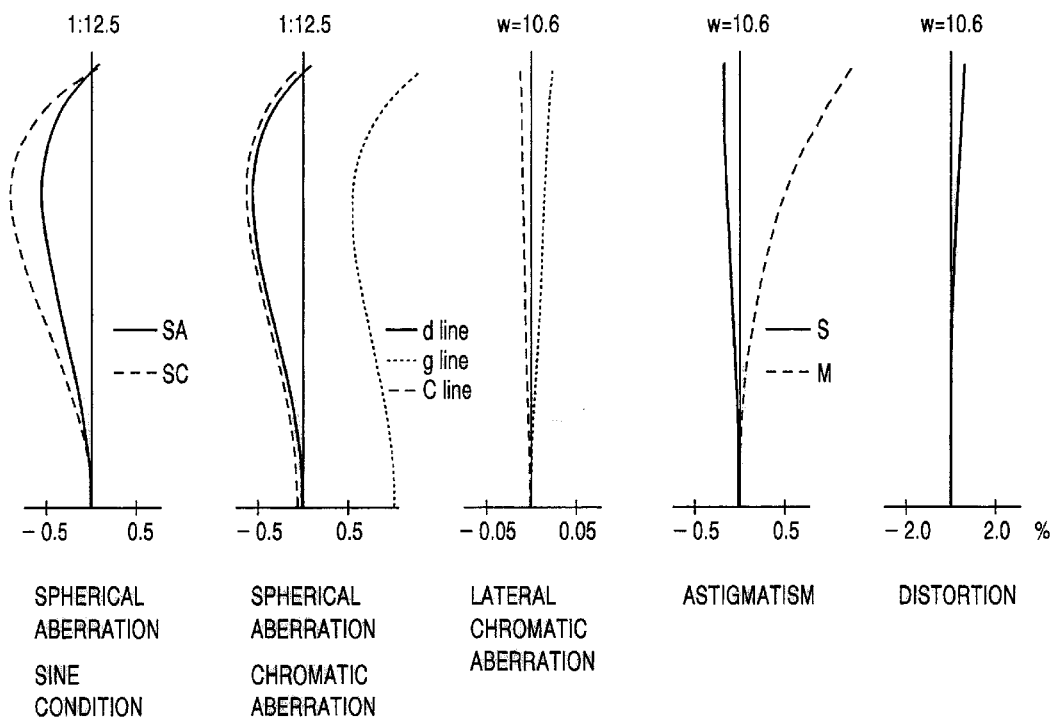

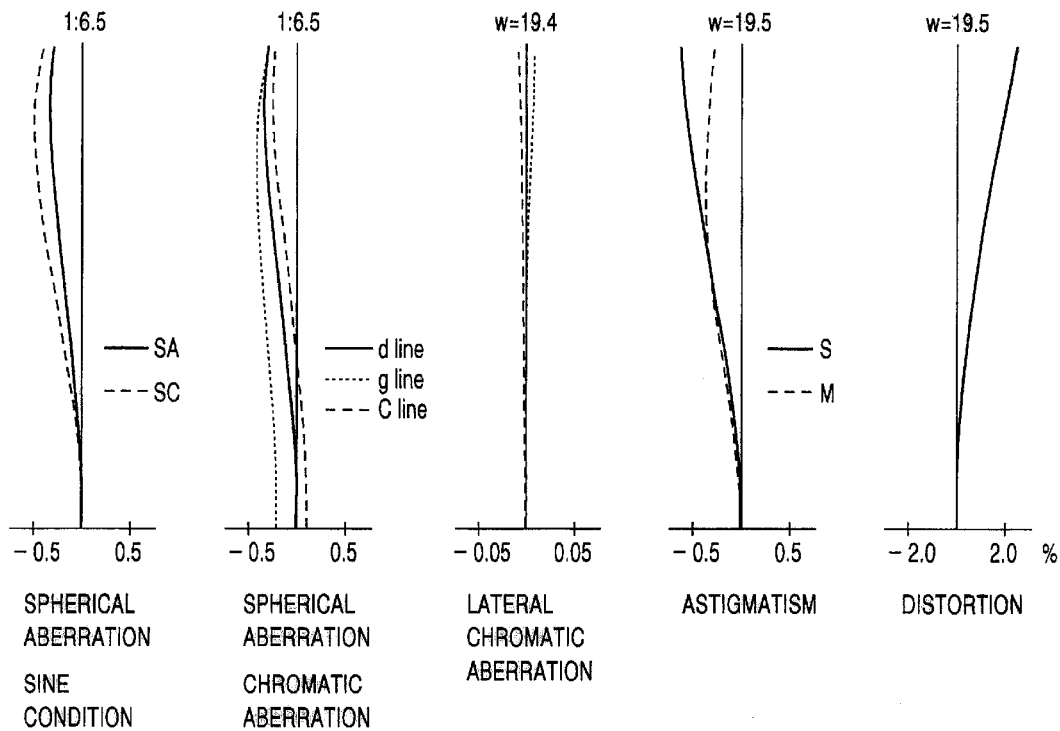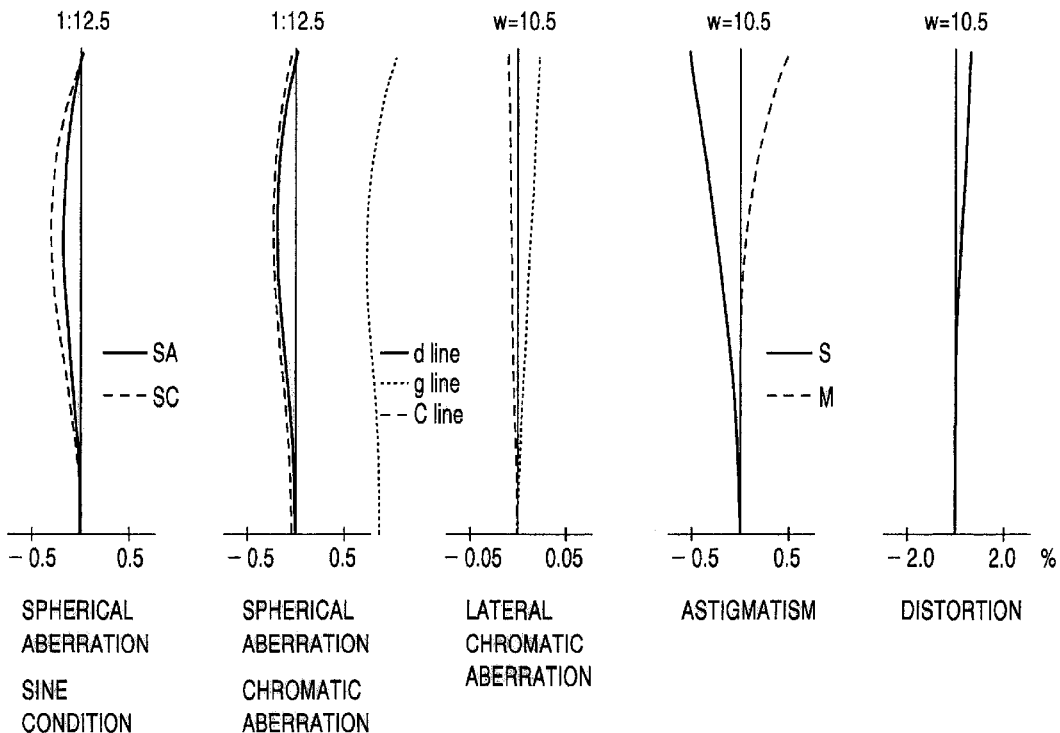

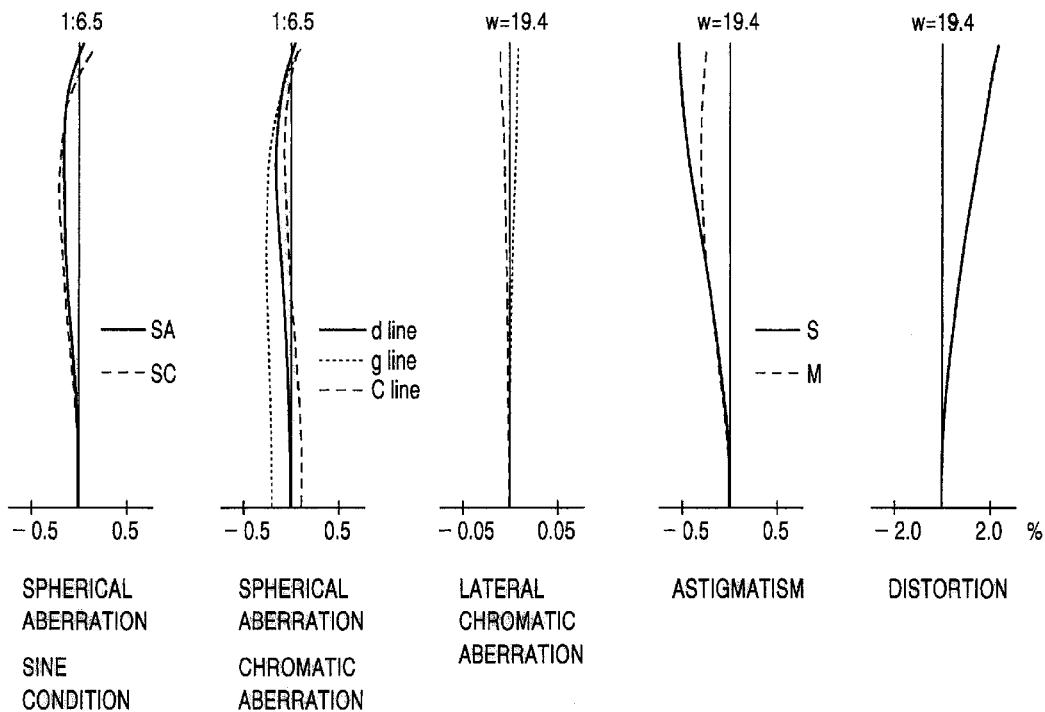
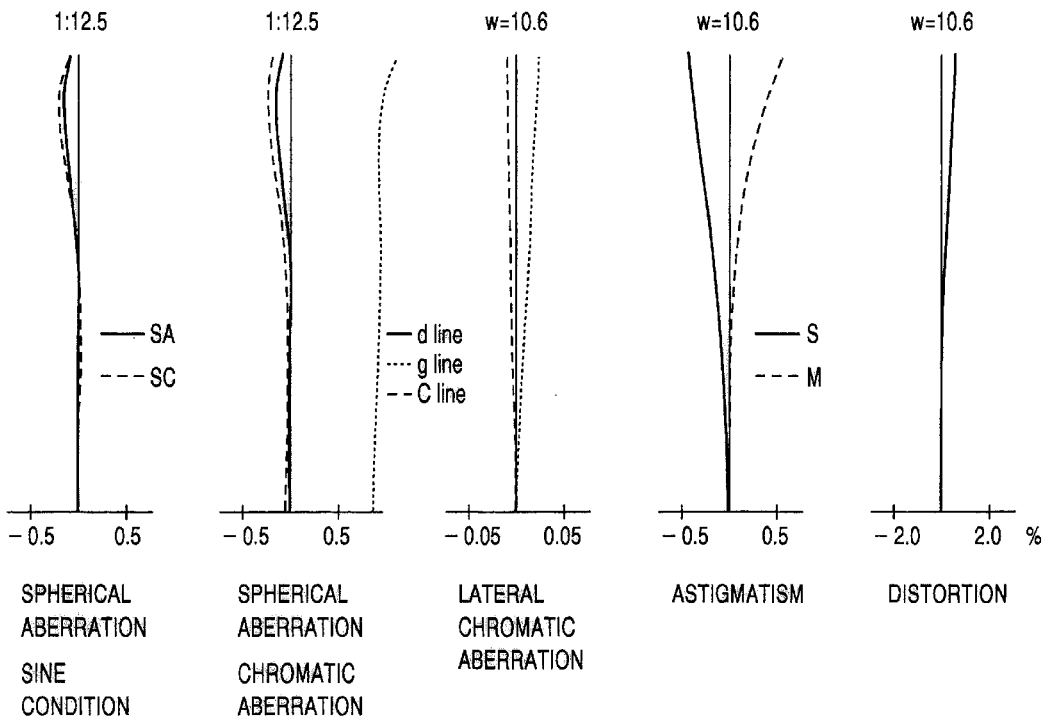

ZOOM LENS SYSTEM

BACKGROUND OF THE INVENTION

The present invention relates to a zoom lens system, and particularly to a two-group zoom lens system applicable to cameras, such as compact cameras that require shorter back focal distance than single lens reflex cameras.

Conventionally, there has been known a two-group zoom lens system for compact cameras including, in order from an object side, a positive first lens group and a negative second lens group. The first and second lens groups are movable along an optical axis for zooming.

In such a two-group zoom lens system, the larger the zoom ratio is, the greater aberrations are. Particularly, chromatic aberration becomes significantly larger.

Further, zoom lens systems having three or more lens groups have been known, while these zoom lens systems are complex in optical and mechanical constructions as compared with the two-group zoom lens system.

SUMMARY OF THE INVENTION

It is therefore an object of the invention to provide an improved zoom lens system that has a zooming ratio of approximately 3.0, and has sufficient optical performance with compact size.

For the above object, according to the present invention, there is provided a zoom lens system that includes a positive first lens group and a negative second lens group that are arranged from an object side. The lens groups move along an optical axis to change the distance therebetween forzooming. The first lens group includes a negative first lens unit and a positive second lens unit that are arranged from the object side and each of the first and second units of the first lens group includes at least one negative lens. The zoom lens system of the present invention satisfies the following conditions (1), (2), (3) and (4);

$$-3.1 < f_t/f_{1a} < -2.5 \quad (1)$$

$$5.8 < f_t/f_{1b} < 7.0 \quad (2)$$

$$1.85 < n_{1an} \quad (3)$$

$$1.85 < n_{1bn} \quad (4)$$

where $f_t$ is the longest focal length of the entire system, $f_{1a}$ is a focal length of the first lens unit;

$f_{1b}$ is a focal length of the second lens unit;

$n_{1an}$ is a refractive index of the negative lens in the first lens unit; and $n_{1bn}$ is a refractive index of the negative lens in the second lens unit.

With this construction, the zoom lens system implements a zooming ratio of approximately 3.0 and sufficient optical performance with a compact two-group construction.

It should be noted that the longest gap between the lenses of the first lens group divides the first and second units of the first lens group.

Preferably, the first lens unit may include a positive lens at the most object side and the following condition (5) may be satisfied;

$$r_2 < 0 \quad (5)$$

where $r_2$ is radius of curvature of an image side surface of the positive lens at the most object side in the first lens unit.

Further, the first lens unit may consist of the positive lens and a negative lens that are arranged from the object side, and the second lens unit may consist of a positive lens and a cemented lens of positive and negative lenses that are arranged from the object side. The order of the positive and negative lenses in the cemented lens is not limited to the above order, and another order can be used.

Still further, the second lens group may consist of a positive lens and a negative lens that are arranged from the object side. In such a case, the negative lens in the second lens group may be a meniscus lens whose concave surface is directed to the object side.

DESCRIPTION OF THE ACCOMPANYING DRAWINGS

FIG. 1 shows a structure of a zoom lens system, at a wide extremity, according to a first embodiment;

FIGS. 2A, 2B, 2C, 2D and 2E are graphs showing various aberrations, which are spherical aberration, chromatic aberration indicated by spherical aberrations, lateral chromatic aberration, astigmatism and distortion, of the zoom lens system according to the first embodiment at the wide extremity;

FIGS. 3A, 3B, 3C, 3D and 3E are graphs showing various aberrations of the zoom lens system according to the first embodiment at an intermediate position within a zooming range;

FIGS. 4A, 4B, 4C, 4D and 4E are graphs showing various aberrations of the zoom lens system according to the first embodiment at a tele extremity;

FIGS. 7A, 7B, 7C, 7D and 7E are graphs showing various aberrations of the zoom lens system according to the second embodiment at the intermediate position within the zooming range;

FIGS. 8A, 8B, 8C, 8D and 8E are graphs showing various aberrations of the zoom lens system according to the second embodiment at the tele extremity;

FIGS. 11A, 11B, 11C, 11D and 11E are graphs showing various aberrations of the zoom lens system according to the third embodiment at the intermediate position within the zooming range;

FIGS. 12A, 12B, 12C, 12D and 12E are graphs showing various aberrations of the zoom lens system according to the third embodiment at the tele extremity;

FIGS. 15A, 15B, 15C, 15D and 15E are graphs showing various aberrations of the zoom lens system according to the fourth embodiment at the intermediate position within the zooming range;

FIGS. 16A, 16B, 16C, 16D and 16E are graphs showing various aberrations of the zoom lens system according to the fourth embodiment at the tele extremity;

DESCRIPTION OF THE EMBODIMENTS

Figure 5:
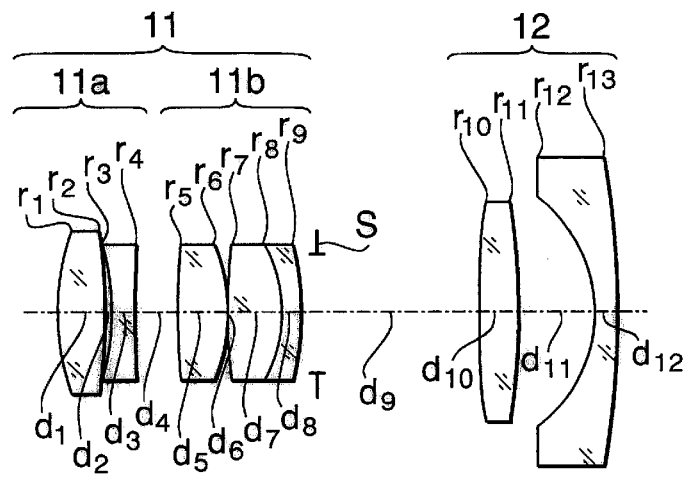
FIG. 5 shows a structure of a zoom lens system, at the wide extremity, according to a second embodiment.
Figures 6A, 6B, 6C, 6D, 6E:
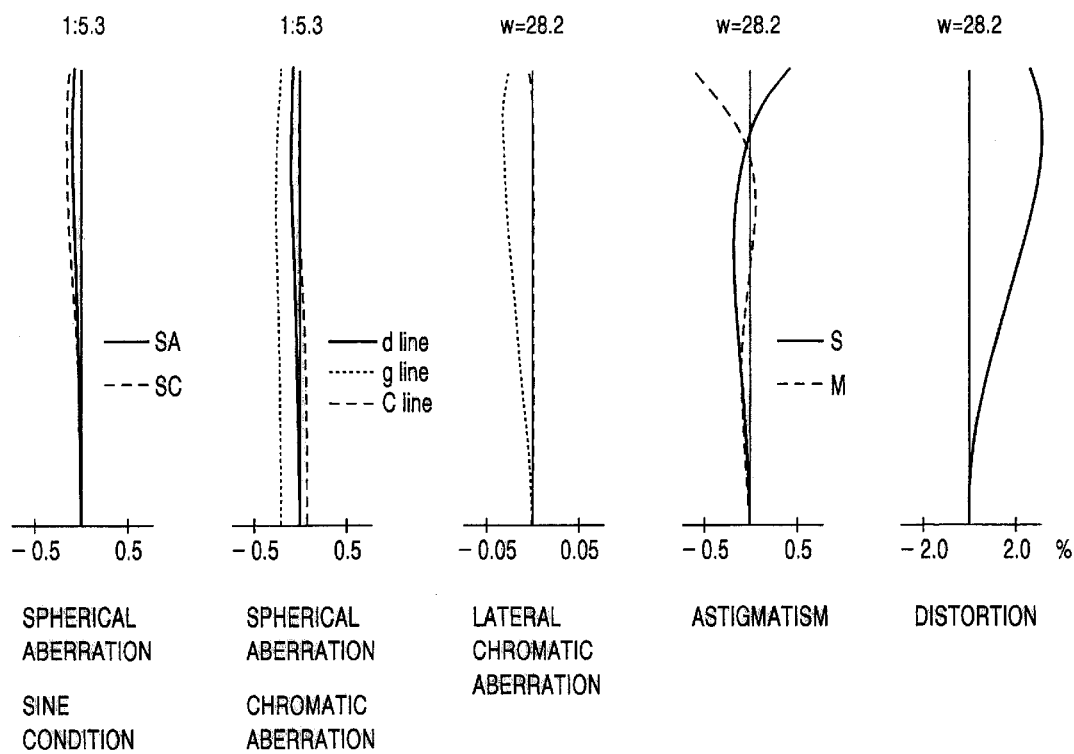
FIGS. 6A, 6B, 6C, 6D and 6E are graphs showing various aberrations of the zoom lens system according to the second embodiment at the wide extremity.

Embodiments of the present invention will be described with reference to the drawings. It should be noted that, in the specification, terms "wide extremity" and "tele extremity" are used for expressing the zooming condition. When it is described that the zoom lens system is positioned to the "tele extremity", all the elements included in the zoom lens are positioned such that the zoom lens system has the longest focal length. Similarly, when it is described that the zoom lens system is positioned to the "wide extremity", all the elements included in the zoom lens system are positioned such that the zoom lens system has the shortest focal length.

A zoom lens system of an embodiment includes, as shown in FIG. 1 for example, a positive first lens group 11 and a negative second lens group 12 that are arranged from an object side. The lens groups 11 and 12 move along an optical axis to change the distance therebetween for zooming. An aperture stop S is located between the first and second lens groups and moves together with the first lens group 11.

The first lens group 11 includes a negative first lens unit 11a and a positive second lens unit 11b that are arranged from the object side. Each of the first and second units 11a and 11b of the first lens group 11 includes at least one negative lens. Namely, the first lens unit 11a consists of a positive lens and a negative lens that are arranged from the object side, and the second lens unit 11b consists of a positive lens and a cemented lens of positive and negative lenses that are arranged from the object side.

The second lens group 12 consists of a positive lens and a negative lens that are arranged from the object side. The negative lens in the second lens group 12 is a meniscus lens whose concave surface is directed to the object side.

The zoom lens system of the embodiment satisfies the following conditions (1), (2), (3) and (4);

$$-3.1 < f_t/f_{1a} < -2.5 \quad (1)$$

$$5.8 < f_t/f_{1b} < 7.0 \quad (2)$$

$$1.85 < n_{1an} \quad (3)$$

$$1.85 < n_{1bn} \quad (4)$$

where $f_t$ is the longest focal length of the entire system,
$f_{1a}$ is a focal length of the first lens unit 11a;
$f_{1b}$ is a focal length of the second lens unit 11b;
$n_{1an}$ is a refractive index of the negative lens in the first lens unit 11a; and
$n_{1bn}$ is a refractive index of the negative lens in the second lens unit 11b.

Compact design of the positive-negative type two-group zoom lens requires large powers for both of the first and second lens groups 11 and 12.

The conditions (1) and (2) define the powers of the first and second lens units 11a and 11b with respect to the entire power of the zoom lens system for the compact lens design. When "$f_t/f_{1a}$" is smaller than −3.1 or "$f_t/f_{1b}$" is larger than 7.0, the moving amount of the lens groups for the zooming becomes too large, which is contrary to the compact design. On the other hand, when "$f_t/f_{1a}$" is larger than −2.5 or "$f_t/f_{1b}$" is smaller than 5.8, aberrations, particularly spherical aberration become too large to compensate.

The first lens group 11 has large positive power, which requires negative lenses having high refractive indices in the first lens group 11 in order to compensate the various aberrations. Therefore, each of the first and second lens units 11a and 11b includes at least one negative lens having high refractive index.

The high refractive index negative lens in the first lens unit 11a mainly acts on compensation for distortion and astigmatism. The high refractive index negative lens in the second lens unit 11b mainly acts on compensation for spherical aberration and coma.

On the other hand, since the negative power of the negative lenses in the first lens group 11 increases as the entire length of the zoom lens system decreases, the absolute value of focal length of the negative lens becomes small in the compact design. Therefore, if the refractive index of the negative lens is also small, Petzval sum $$\left( = \sum \frac{1}{f_i \times n_i} \right)$$

of the zoom lens system may have negative value. The negative Petzval sum enlarges sagittal astigmatism in plus (over) direction in the vicinity of the wide extremity. Thus, the refractive indices of the negative lenses in the first lens group should be higher to bring the Petzval sum to zero.

The conditions (3) and (4) define the lower limits of the refractive indices of the negative lenses included in the first and second lens unit 11a and 11b, respectively. When the conditions are satisfied, the various aberrations can be compensated and the Petzval sum approaches zero.

The positive lens located at the most object side of the first lens unit 11a preferably satisfies the following condition (5);

$$r_2 < 0 \quad (5)$$

where $r_2$ is radius of curvature of an image side surface of the positive lens at the most object side in the first lens unit 11a.

If the $r_2$ has a positive value, the spherical aberration becomes too large to compensate at the vicinity of the tele extremity.

[First Embodiment]

FIG. 1 shows the construction of the zoom lens system according to a first embodiment at the wide extremity. The zoom lens system includes the positive first lens group 11 that includes the first and second lens unit 11a and 11b, the negative second lens group 12 and the aperture stop S that is disposed between the first and second lens groups 11 and 12.

The numerical construction of the zoom lens system is described in TABLE 1. In the table, r (mm) denotes a radius of curvature of a surface (the values at the vertex for aspherical surfaces), d (mm) denotes a distance between the surfaces along the optical axis, n denotes a refractive index at a wavelength of 588 nm(d-line) and vd denotes an Abbe number.

The surfaces #1 through #9 indicate the first lens group 11, the surfaces #10 through #13 indicate the second lens group 12. The aperture stop S is located at a distance of 1.300 mm from the surface #9.

The surfaces #10 and #11 are rotationally symmetrical a spherical surfaces. An aspherical surface is expressed by the following equation (6):

$$X(h) = \frac{h^2 C}{1 + \sqrt{1 - (1+K)h^2 C^2}} + A_4 h^4 + A_6 h^6 + A_8 h^8 \quad (6)$$

X(h) is a SAG, that is, a distance of a curve from a tangential plane at a point on the surface where the height from the optical axis is h. C is a curvature (1/r) of the vertex of the surface, K is a conic constant, $A_4$, $A_6$ and $A_8$ are aspherical surface coefficients of fourth, sixth and eighth orders. The constant K and coefficients $A_4$, $A_6$ and $A_8$ are shown in TABLE 2.

The distance d9 is variable for zooming. TABLE 3 shows the distance d9, F-number FNo., focal length f (mm), half view angle ω (degree) and backfocus fB. TABLE 3 shows values at the wide extremity ($f_w$), at the intermediate focal length $f_i$ and at the tele extremity ($f_t$).

TABLE 1

| Surface No. | r | d | n | vd |
|---|---|---|---|---|
| #1 | 16.442 | 3.252 | 1.51742 | 52.4 |
| #2 | −42.517 | 0.462 | | |
| #3 | −16.750 | 1.500 | 1.88300 | 40.8 |
| #4 | 38.186 | 2.331 | | |
| #5 | 78.518 | 3.581 | 1.48749 | 70.2 |
| #6 | −12.373 | 0.100 | | |
| #7 | 129.399 | 3.377 | 1.54814 | 45.8 |
| #8 | −10.539 | 1.300 | 1.88300 | 40.8 |
| #9 | −19.605 | variable | | |
| #10 | 1131.581 | 2.530 | 1.58547 | 29.9 |
| #11 | −68.750 | 4.923 | | |
| #12 | −10.075 | 1.483 | 1.72916 | 54.7 |
| #13 | −72.325 | | | |

TABLE 2

| | #10 | #11 |
|---|---|---|
| K | 0.0000 | 0.0000 |
| A4 | $0.4537 \times 10^{-4}$ | $-0.3195 \times 10^{-4}$ |
| A6 | $0.1238 \times 10^{-5}$ | $0.7516 \times 10^{-6}$ |
| A8 | $-0.2242 \times 10^{-8}$ | $-0.1649 \times 10^{-8}$ |

TABLE 3

| | WIDE(fw) | fi | TELE(ft) |
|---|---|---|---|
| d9 | 12.057 | 7.381 | 3.106 |
| FNo. | 5.3 | 6.9 | 13.2 |
| f | 39.33 | 60.00 | 115.50 |
| | | | (Zoom ratio is 2.94) |
| ω | 28.2 | 19.4 | 10.6 |
| fb | 9.40 | 24.94 | 66.65 |

FIGS. 2A through 2E show third order aberrations of the zoom lens system according to the first embodiment at the wide extremity. Specifically, FIG. 2A shows spherical aberrations at d-line (588 nm), FIG. 2B shows chromatic aberration indicated by spherical aberrations at d-line, g-line (436 nm) and c-line (656 nm), FIG. 2C shows a lateral chromatic aberration at the same wavelengths as in FIG. 2B, FIG. 2D shows an astigmatism (S: Sagittal, M: Meridional), and FIG. 2E shows distortion.

The vertical axis in FIGS. 2A and 2B represents F-number, and the vertical axes in FIGS. 2C through 2E respectively represent a half view angle ω (degrees). Unit of the horizontal axis is "mm" in each of FIGS. 2A through 2D, and is "percent" in FIG. 2E.

FIGS. 3A through 3E show various aberrations of the zoom lens system according to the first embodiment in the intermediate focal length. Further, FIGS. 4A through 4E show various aberrations of the zoom lens system according to the first embodiment at the tele extremity.

[Second Embodiment]

FIG. 5 shows the construction of the zoom lens system according to a second embodiment at the wide extremity. The zoom lens system includes the positive first lens group 11 that includes the first and second lens units 11a and 11b, and the negative second lens group 12.

The numerical construction of the zoom lens system is described in TABLE 4. The aperture stop S is located at a distance of 1.300 mm from the surface #9. The surface #10 is an aspherical surface. The constant and coefficients are shown in TABLE 5. Variable values due to zooming are shown in TABLE 6.

TABLE 4

| Surface No. | r | d | n | vd |
|---|---|---|---|---|
| #1 | 17.749 | 3.070 | 1.51742 | 52.4 |
| #2 | −48.084 | 0.499 | | |
| #3 | −16.887 | 1.500 | 1.88300 | 40.8 |
| #4 | 50.393 | 2.907 | | |
| #5 | 76.214 | 3.353 | 1.48749 | 70.2 |
| #6 | −12.577 | 0.100 | | |
| #7 | 84.893 | 3.493 | 1.54814 | 45.8 |
| #8 | −10.556 | 1.300 | 1.88300 | 40.8 |
| #9 | −21.448 | variable | | |
| #10 | −208.070 | 2.530 | 1.58547 | 29.9 |
| #11 | −52.902 | 5.083 | | |
| #12 | −10.106 | 1.431 | 1.72916 | 54.7 |
| #13 | −70.649 | | | |

TABLE 5

| Surface No. | #10 |
|---|---|
| K | 0.0000 |
| A4 | $0.8162 \times 10^{-4}$ |
| A6 | $0.9182 \times 10^{-7}$ |
| A8 | $0.4800 \times 10^{-8}$ |

TABLE 6

| | WIDE(fw) | fi | TELE(ft) |
|---|---|---|---|
| d9 | 12.068 | 7.488 | 3.3 |
| FNo. | 5.6 | 6.9 | 13.3 |
| f | 39.33 | 60.00 | 115.50 |
| | | | (Zoom ratio is 2.94) |
| ω | 28.2 | 19.4 | 10.6 |
| fb | 9.30 | 24.70 | 66.03 |

FIGS. 6A through 6E show various aberrations of the zoom lens system according to the second embodiment at the wide extremity. FIGS. 7A through 7E and FIGS. 8A through 8E show various aberrations of the zoom lens system according to the second embodiment in the intermediate focal length and at the tele extremity, respectively.

[Third Embodiment]

Figure 9:
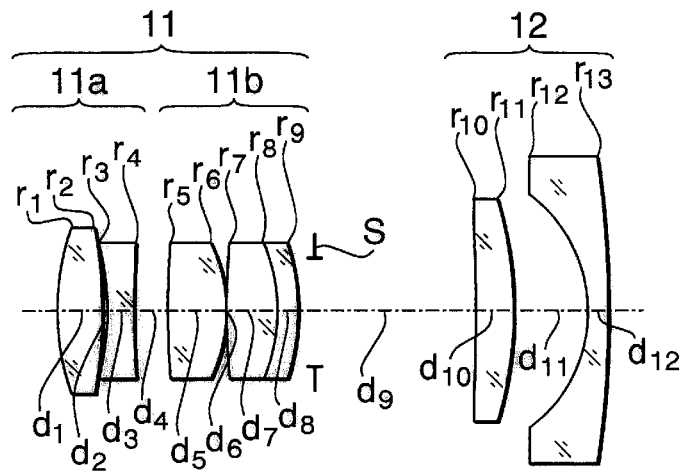
FIG. 9 shows a structure of a zoom lens system, at the wide extremity, according to a third embodiment.
Figures 10A, 10B, 10C, 10D, 10E:
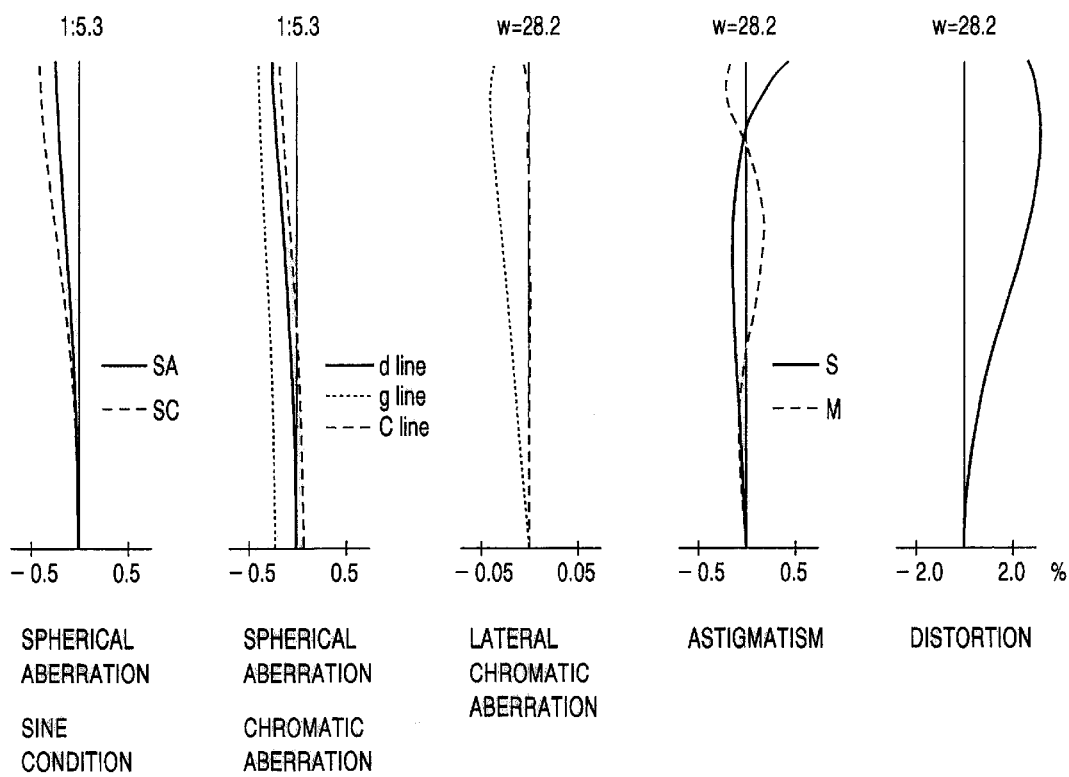
FIGS. 10A, 10B, 10C, 10D and 10E are graphs showing various aberrations of the zoom lens system according to the third embodiment at the wide extremity.

FIG. 9 shows the construction of the zoom lens system according to a third embodiment at the wide extremity. The zoom lens system includes the positive first lens group 11 that includes the first and second lens units 11a and 11b, and the negative second lens group 12.

The numerical construction of the zoom lens system is described in TABLE 7. The aperture stop S is located at a distance of 1.300 mm from the surface #9. The surfaces #10 and #11 are aspherical surfaces. The constants and coefficients are shown in TABLE 8. Variable values due to zooming are shown in TABLE 9.

TABLE 7

| Surface No. | r | d | n | vd |
|---|---|---|---|---|
| #1 | 18.390 | 3.060 | 1.51742 | 52.4 |
| #2 | −40.836 | 0.470 | | |
| #3 | −16.408 | 1.660 | 1.88300 | 40.8 |
| #4 | 57.000 | 2.250 | | |
| #5 | 83.914 | 3.900 | 1.48749 | 70.2 |
| #6 | −12.538 | 0.100 | | |
| #7 | 127.330 | 3.450 | 1.54814 | 45.8 |
| #8 | −10.539 | 1.300 | 1.88300 | 40.8 |
| #9 | −20.388 | variable | | |
| #10 | −98.274 | 2.530 | 1.58547 | 29.9 |
| #11 | −38.297 | 5.020 | | |
| #12 | −10.075 | 1.340 | 1.72916 | 54.7 |
| #13 | −76.530 | | | |

TABLE 8

| | #10 | #11 |
|---|---|---|
| K | 0.0000 | 0.0000 |
| A4 | $0.2334 \times 10^{-4}$ | $-0.5708 \times 10^{-4}$ |
| A6 | $0.9182 \times 10^{-7}$ | $-0.1867 \times 10^{-7}$ |
| A8 | $0.1468 \times 10^{-8}$ | $-0.6455 \times 10^{-8}$ |

TABLE 9

| | WIDE(fw) | fi | TELE(ft) |
|---|---|---|---|
| d9 | 12.106 | 7.506 | 3.303 |
| FNo. | 5.6 | 6.9 | 13.2 |
| f | 39.32 | 60.00 | 115.50 |
| | | | (Zoom ratio is 2.94) |
| ω | 28.2 | 19.4 | 10.5 |
| fb | 9.38 | 24.81 | 66.23 |

FIGS. 10A through 10E show various aberrations of the zoom lens system according to the third embodiment at the wide extremity. FIGS. 11A through 11E and FIGS. 12A through 12E show various aberrations of the zoom lens system according to the third embodiment in the intermediate focal length and at the tele extremity, respectively.

[Fourth Embodiment]

Figure 13:
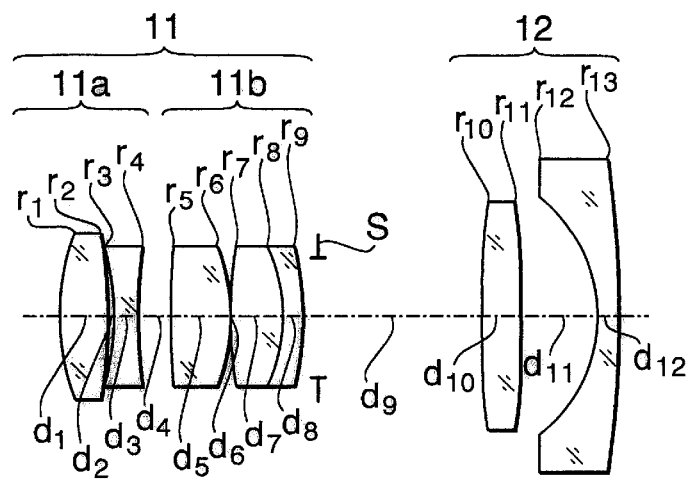
FIG. 13 shows a structure of a zoom lens system, at the wide extremity, according to a fourth embodiment.
Figures 14A, 14B, 14C, 14D, 14E:
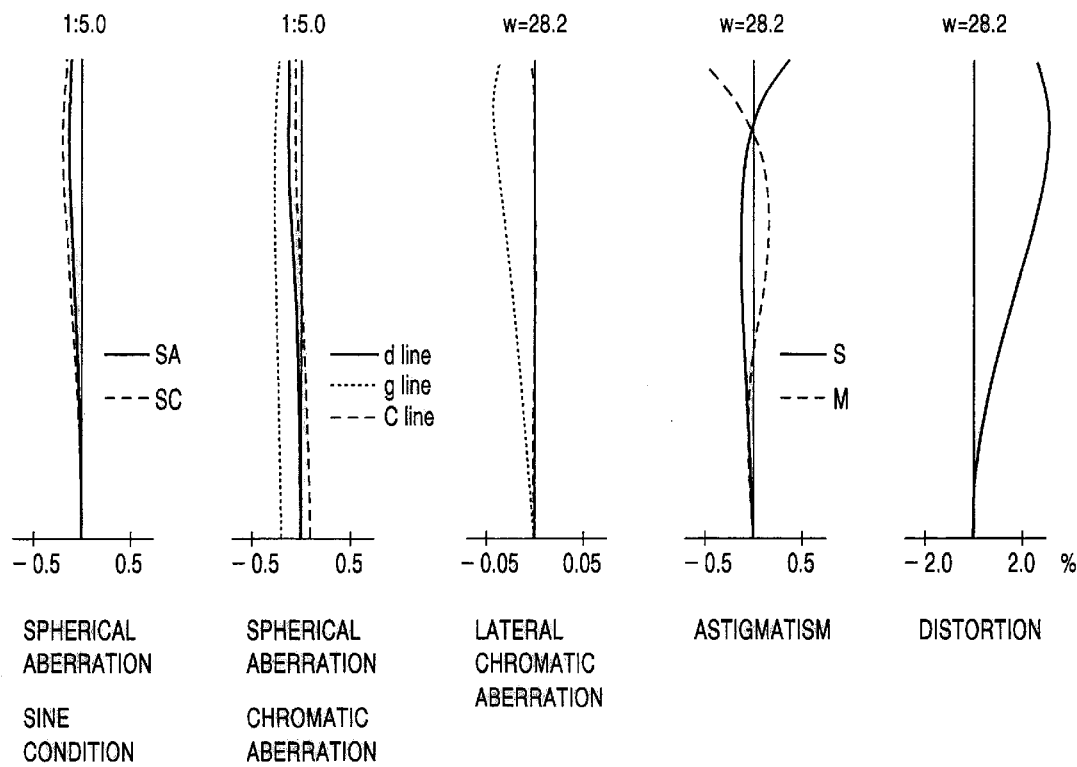
FIGS. 14A, 14B, 14C, 14D and 14E are graphs showing various aberrations of the zoom lens system according to the fourth embodiment at the wide extremity.

FIG. 13 shows the construction of the zoom lens system according to a fourth embodiment at the wide extremity. The zoom lens system consists of the positive first lens group 11 that includes the first and second lens units 11a and 11b, and the negative second lens group 12.

The numerical construction of the zoom lens system is described in TABLE 10. The aperture stop S is located at a distance of 1.300 mm from the surface #9. The surfaces #10 and #11 are aspherical surfaces. The constants and coefficients are shown in TABLE 11. Variable values due to zooming are shown in TABLE 12.

TABLE 10

| Surface No. | r | d | n | vd |
|---|---|---|---|---|
| #1 | 16.700 | 3.130 | 1.51742 | 52.4 |
| #2 | −44.200 | 0.460 | | |
| #3 | −17.040 | 1.540 | 1.88300 | 40.8 |
| #4 | 40.309 | 2.220 | | |
| #5 | 81.224 | 4.000 | 1.48749 | 70.2 |
| #6 | −12.500 | 0.100 | | |

TABLE 10-continued

| Surface No. | r | d | n | vd |
|---|---|---|---|---|
| #7 | 116.421 | 3.390 | 1.54814 | 45.8 |
| #8 | −10.539 | 1.300 | 1.88300 | 40.8 |
| #9 | −20.049 | variable | | |
| #10 | 412.327 | 2.530 | 1.58547 | 29.9 |
| #11 | −80.120 | 5.080 | | |
| #12 | −10.075 | 1.400 | 1.72916 | 54.7 |
| #13 | −70.160 | | | |

TABLE 11

| | #10 | #11 |
|---|---|---|
| K | 0.0000 | 0.0000 |
| A4 | $0.4653 \times 10^{-4}$ | $-0.3195 \times 10^{-4}$ |
| A6 | $0.1238 \times 10^{-5}$ | $0.7966 \times 10^{-6}$ |
| A8 | $-0.2075 \times 10^{-8}$ | $-0.1533 \times 10^{-8}$ |

TABLE 12

| | WIDE(fw) | fi | TELE(ft) |
|---|---|---|---|
| d9 | 12.061 | 7.358 | 3.060 |
| FNo. | 5.3 | 6.9 | 13.3 |
| f | 39.33 | 60.00 | 115.50 |
| | | | (Zoom ratio is 2.94) |
| ω | 28.2 | 19.4 | 10.6 |
| fb | 9.36 | 24.84 | 66.40 |

FIGS. 14A through 14E show various aberrations of the zoom lens system according to the fourth embodiment at the wide extremity. FIGS. 15A through 15E and FIGS. 16A through 16E show various aberrations of the zoom lens system according to the fourth embodiment in the intermediate focal length and at the tele extremity, respectively.

The following TABLE 13 shows the values of the first to fifth embodiments for conditions (1) to (5).

TABLE 13

| | Embodiments | | | |
|---|---|---|---|---|
| Conditions | 1 | 2 | 3 | 4 |
| (1) $f_1/f_{1a}$ | −3.06 | −2.91 | −2.78 | −2.97 |
| (2) $f_1/f_{1b}$ | 6.94 | 6.75 | 6.67 | 6.82 |
| (3) $n_{1an}$ | 1.883 | 1.883 | 1.883 | 1.883 |
| (4) $n_{1bn}$ | 1.883 | 1.883 | 1.883 | 1.883 |
| (5) $r_2$ | −42.52 | −48.08 | −40.84 | −44.20 |

Each of the embodiments satisfies conditions (1) through (5), and is suitable to the zoom lens system for compact cameras.

The present disclosure relates to the subject matter contained in Japanese Patent Application No. HEI 10-365720, filed on Dec. 22, 1998, which is expressly incorporated herein by reference in its entirety.

What is claimed is:

1. A zoom lens system comprising, in order from an object side:
   a positive first lens group that is movable along an optical axis for zooming, said positive first lens group including a negative first lens unit and a positive second lens unit that are arranged from said object side; and
   a negative second lens group that is movable along said optical axis for zooming;
   wherein each of said first and second lens units of said first lens group includes at least one negative lens, and wherein the following conditions (1), (2), (3) and (4) are satisfied, $$-3.1 < f_t/f_{1a} < -2.5 \quad (1)$$

$$5.8 < f_t/f_{1b} < 7.0 \quad (2)$$

$$1.85 < n_{1an} \quad (3)$$

$$1.85 < n_{1bn} \quad (4)$$

where $f_t$ is the longest focal length of the entire system, $f_{1a}$ is a focal length of the first lens unit;

$f_{1b}$ is a focal length of the second lens unit;

$n_{1an}$ is a refractive index of the negative lens in said first lens unit; and $n_{1bn}$ is a refractive index of the negative lens in the second lens unit.

2. The zoom lens system according to claim 1, wherein said first lens unit includes a positive lens at the most object side and wherein the following condition (5) is satisfied;

$$r_2 < 0 \quad (5)$$

where $r_2$ is radius of curvature of an image side surface of said positive lens at the most object side in said first lens unit.

3. The zoom lens system according to claim 1, wherein said first lens unit consists of a positive lens and a negative lens that are arranged from said object side, and said second lens unit consists of a positive lens and a cemented lens of positive and negative lenses that are arranged from said object side.

4. The zoom lens system according to claim 1, wherein said second lens group consists of a positive lens and a negative lens that are arranged from said object side.

5. The zoom lens system according to claim 4, wherein said negative lens in said second lens group is a meniscus lens whose concave surface is directed to said object side.

* * * * *